US 6,692,711 B1

(12) United States Patent
Alexion et al.

(10) Patent No.: US 6,692,711 B1
(45) Date of Patent: Feb. 17, 2004

(54) PRODUCTION OF LOW SULFUR SYNGAS FROM NATURAL GAS WITH $C_{4+}/C_{5+}$ HYDROCARBON RECOVERY

(75) Inventors: Dennis G. Alexion, Succasunna, NJ (US); Robert B. Fedich, Long Valley, NJ (US); John C. Wilbur, Bella Vista, AZ (US); James H. Taylor, Jr., Baton Rouge, LA (US); James P. Glass, Jr., Baton Rouge, LA (US); Geoffrey R. Say, Baton Rouge, LA (US); Richard P. O'Connor, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/586,089

(22) Filed: Jun. 2, 2000

Related U.S. Application Data

(62) Division of application No. 09/012,537, filed on Jan. 23, 1998, now Pat. No. 6,168,768.

(51) Int. Cl.$^7$ .......................... B01D 47/00; C01B 17/00; C01B 17/04; C01B 17/16
(52) U.S. Cl. ........................ 423/210; 423/220; 423/228; 423/229; 423/230
(58) Field of Search .......................... 252/373; 423/210, 423/220, 228, 229, 230; 518/705

(56) References Cited

U.S. PATENT DOCUMENTS

| | | | |
|---|---|---|---|
| 3,441,370 A | 4/1969 | Gutmann et al. ................. | 23/2 |
| 3,864,460 A | 2/1975 | Connell ....................... | 423/574 |
| 4,070,165 A | * 1/1978 | Colton ........................... | 95/94 |
| 4,093,029 A | 6/1978 | Weisz et al. ............ | 166/305 R |
| 4,094,650 A | * 6/1978 | Koh et al. ................ | 48/197 R |
| 4,112,051 A | 9/1978 | Sartori et al. ............... | 423/223 |

(List continued on next page.)

FOREIGN PATENT DOCUMENTS

| | | | |
|---|---|---|---|
| EP | 0207645 | 1/1987 | .......... C07C/7/148 |
| GB | 1192739 | 5/1970 | .......... C10G/49/12 |
| WO | WO 9913966 | 3/1999 | .......... B01D/53/18 |

OTHER PUBLICATIONS

True, Warren R., "Maxus Starts Up Texas Panhandle Gas Plant", Oil & Gas Journal, Jun. 28, 1993, vol. 91, pp. 68–69.
Christensen, Thomas S. et al., "Fundamentals in Design of Adiabatic Preconverters for Steam Reforming of Hydrocarbons", 2nd Nordic Symposium on Catalysis, Lyngby, Denmark, Nov. 2–3, 1989.
Meyers, Robert A., Handbook of Petroleum Refining Processes, Second Edition, McGraw Hill, 1997.
Christensen, Thomas S., "Adiabatic Prereforming of Hydrocarbons—an Important Step in Syngas Production", Applied Catalysis A: General 138 (1996) pp. 285–309.
Van der Burgt, Maarten et al., "The Shell Middle Distillate Synthesis Process", Petroleum Review, Apr. 1990, pp. 204–209.

*Primary Examiner*—Steven Bos
*Assistant Examiner*—Anthony Kuhan
(74) *Attorney, Agent, or Firm*—Estelle C. Bakun

(57) ABSTRACT

Sour natural gas is processed to remove the sulfur compounds and recover $C_{4+}/C_{5+}$ hydrocarbons by scrubbing the gas with an amine solution to remove most of the sulfur, followed cooling the gas to remove $C_{4+}/C_{5+}$ hydrocarbons and more sulfur compounds as liquid condensate to produce a gas having less than 20 vppm of total sulfur. The condensate is sent to a fractionator to recover the $C_{4+}/C_{5+}$ hydrocarbons. The sulfur and hydrocarbon reduced gas is contacted first with zinc oxide and then nickel, to produce a gas having less than 10 vppb of total sulfur which is passed into a synthesis gas generating unit to form a very low sulfur synthesis gas comprising a mixture of $H_2$ and CO. This synthesis gas is useful for hydrocarbon synthesis with increased life of the hydrocarbon synthesis catalyst and greater hydrocarbon production from the hydrocarbon synthesis reactor. Contacting the synthesis gas with zinc oxide further reduces the sulfur content to below 3 vppb.

6 Claims, 1 Drawing Sheet

U.S. PATENT DOCUMENTS

| | | | |
|---|---|---|---|
| 4,150,962 A | 4/1979 | Colton | 62/17 |
| 4,175,928 A * | 11/1979 | Britton et al. | 48/197 R |
| 4,196,174 A | 4/1980 | Steiner et al. | 423/230 |
| 4,273,748 A | 6/1981 | Takahashi et al. | 423/230 |
| 4,285,917 A | 8/1981 | Knight | 423/224 |
| 4,305,733 A | 12/1981 | Scholz et al. | 48/196 |
| 4,372,925 A | 2/1983 | Cornelisse | 423/226 |
| 4,421,535 A | 12/1983 | Mehra | 62/17 |
| 4,561,869 A | 12/1985 | Gazzi et al. | 62/17 |
| 4,606,741 A | 8/1986 | Moreau et al. | 55/16 |
| 4,709,118 A | 11/1987 | Yan | 585/820 |
| 4,710,210 A | 12/1987 | Gazzi et al. | 62/17 |
| 4,710,211 A | 12/1987 | Gazzi et al. | 62/17 |
| 4,957,715 A | 9/1990 | Grover et al. | 423/228 |
| 4,979,966 A | 12/1990 | Rojey et al. | 55/32 |
| 5,094,996 A | 3/1992 | Kidd | 502/405 |
| 5,096,673 A | 3/1992 | Gammie et al. | 422/198 |
| 5,114,689 A | 5/1992 | Nagji et al. | 423/230 |
| 5,173,513 A | 12/1992 | Pinto | 518/704 |
| 5,232,467 A | 8/1993 | Child et al. | 48/127.3 |
| 5,248,488 A | 9/1993 | Yan | 423/210 |
| 5,271,835 A | 12/1993 | Gorawara et al. | 208/228 |
| 5,451,249 A | 9/1995 | Spiegel et al. | 95/117 |
| 5,659,109 A | 8/1997 | Fernandez de la Vega et al. | 585/834 |
| 5,763,716 A | 6/1998 | Benham et al. | 585/315 |
| 5,770,630 A | 6/1998 | Kowal et al. | 518/706 |
| 5,882,614 A * | 3/1999 | Taylor et al. | 423/230 |
| 5,985,178 A * | 11/1999 | Long et al. | 252/373 |
| 6,107,353 A * | 8/2000 | Koveal et al. | 518/705 |
| 6,162,373 A * | 12/2000 | Koveal, Jr. | 252/373 |
| 6,168,768 B1 | 1/2001 | Alexion et al. | 423/210 |

* cited by examiner

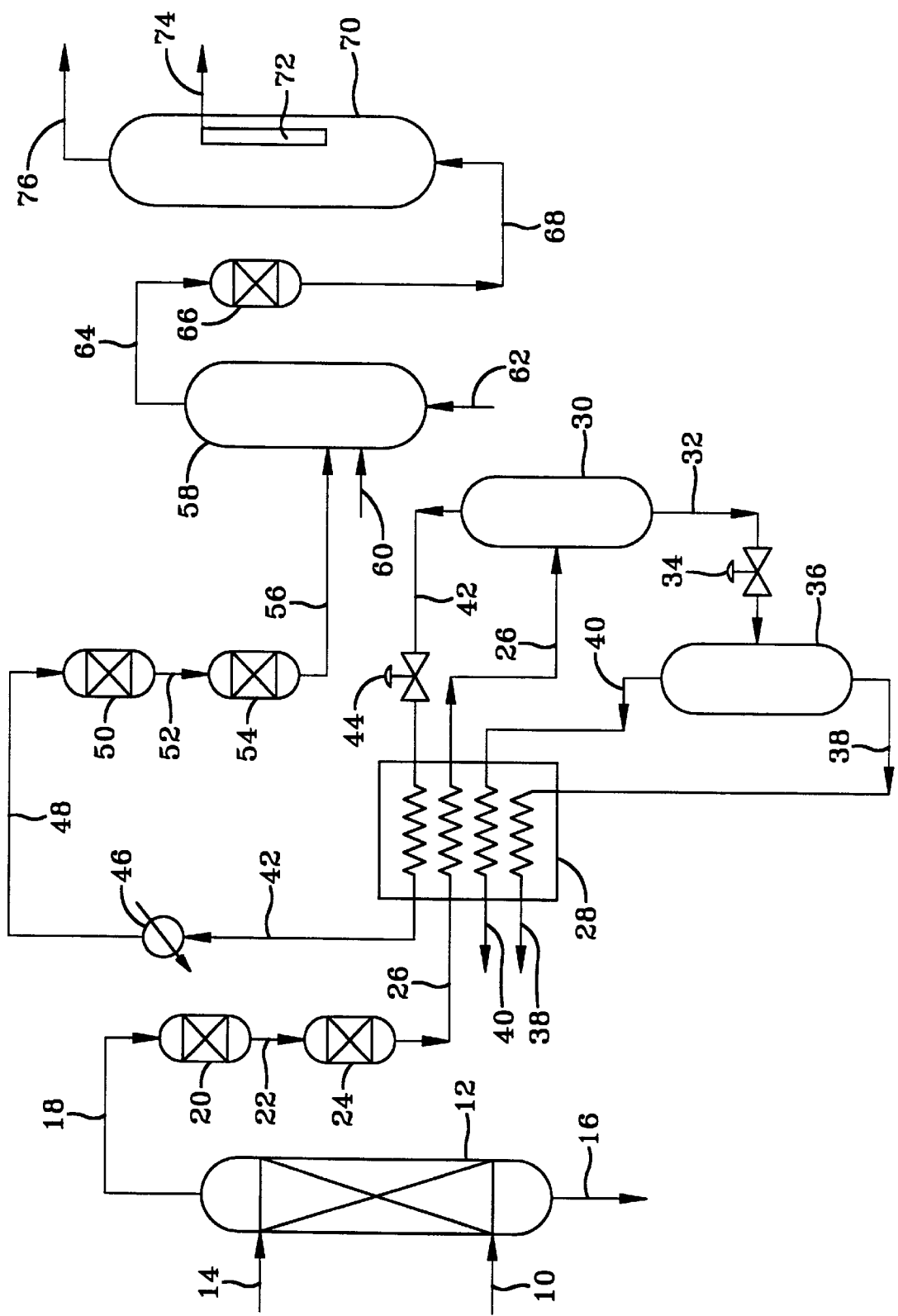

PRODUCTION OF LOW SULFUR SYNGAS FROM NATURAL GAS WITH $C_{4+}/C_{5+}$ HYDROCARBON RECOVERY

This application is a Divisional Application of U.S. application Ser. No. 08/012,537 filed Jan. 23, 1998, now U.S. Pat. No. 6,168,768.

BACKGROUND OF THE INVENTION

1. Field of the Invention

The invention relates to a process for producing low sulfur synthesis gas (syngas) from natural gas with $C_{4+}/C_{5+}$ hydrocarbon recovery. More particularly the invention relates to producing very low sulfur syngas from sour natural gas with $C_{4+}/C_{5+}$ hydrocarbon recovery and to the use of the syngas for hydrocarbon synthesis. The sulfur content of the syngas is less than 10 vppb and preferably less than 3 vppb. The process includes treating the natural gas by amine scrubbing, low temperature hydrocarbon and sulfur separation, followed by contact with zinc oxide and then nickel.

2. Background of the Invention

Hydrocarbon synthesis (HCS) processes are well known and include fixed bed, fluid bed and slurry type processes in which a synthesis gas (syngas) comprising a mixture of $H_2$ and CO is reacted in the presence of a suitable Fischer-Tropsch type of hydrocarbon synthesis catalyst at conditions effective to form hydrocarbons, and preferably paraffinic hydrocarbons which are solid at standard room temperature conditions of temperature and pressure. The syngas is produced by reacting a low molecular weight hydrocarbon gas with oxygen and steam via well known processes which include partial oxidation, catalytic steam reforming and combination thereof, using a fixed or fluid catalyst bed. In a fluid bed syngas generation (FBSG) process, partial oxidation and steam reforming both occur in the presence of the steam reforming catalyst. This process has the advantage of superior heat and mass transfer. In autothermal reforming the hydrocarbon is first partially oxidized and then separately catalytically steam reformed. These and other syngas processes and their relative merits are discussed, for example, in U.S. Pat. Nos. 4,877,550; 4,888,131 and 5,160,456. A preferred source of the low molecular weight hydrocarbon is natural gas in which the hydrocarbon comprises primarily methane with minor amounts (e.g., ~1–10%) of $C_{2+}$ hydrocarbons, including $C_{4+}$ hydrocarbons. Other natural gas components include nitrogen, carbon dioxide, water vapor and sulfur in the form of sulfur bearing compounds including $H_2S$, mercaptans (RSH), other organic sulfides generally, carbonyl sulfide (COS) and sometimes minor amounts of carbon disulfide. Sulfur in the feed to a syngas generator will poison the steam reforming catalyst and result in a loss of syngas productivity. Certain HCS catalysts are easily poisoned and permanently deactivated by these sulfur bearing compounds. Those comprising a cobalt catalytic component are particularly sensitive and as little as 0.1 vppm (volume parts per million) of sulfur compounds present in the syngas feed to the HCS reactor will permanently deactivate the catalyst in less than 10 days. Even levels as low as, for example, 10 vppb (volume parts per billion) are unacceptably high for a commercial HCS plant. As the catalyst deactivates, hydrocarbon production decreases and the reactor has to be taken off line for catalyst replacement. Consequently, the ability to achieve highly productive hydrocarbon synthesis with such catalysts, on a sustainable basis, has not yet been achieved. It would be an improvement to the art to be able to produce syngas having less than 10 vppb of sulfur compounds from sour natural gas by a method which also recovers the valuable $C_{4+}$ and/or $C_{5+}$ hydrocarbons.

SUMMARY OF THE INVENTION

A process for producing low sulfur synthesis gas (syngas) from natural gas which contains $C_{4+}/C_{5+}$ hydrocarbons, with recovery of these hydrocarbons from the gas, comprises scrubbing or contacting the gas with a liquid sulfur absorbent to remove most of the sulfur, followed by low temperature cooling to remove more sulfur compounds and the $C_{4+}/C_{5+}$ hydrocarbons, and then contacting the sulfur and hydrocarbon reduced gas first with zinc oxide and then nickel to reduce the sulfur content to less than 0.1 vppb/m (volume parts per million) and preferably less than 80 vppb (parts per billion), before it is passed into the syngas generator. The syngas exiting the syngas generator is then contacted with zinc oxide to remove remaining sulfur from the gas. This process produces a syngas feed having less than 10 vpp, of sulfur in the form of sulfur bearing compounds and recovers the valuable $C_{4+}/C_{5+}$ hydrocarbons from the feed, so that they are not wasted by being passed into the syngas generator. The $C_{4+}/C_{5+}$ hydrocarbons recovered from the natural gas are upgraded by hydrorefining and fractionation. The zinc oxide and nickel react with the sulfur compounds remaining in the gas after the scrubbing and cooling, to form zinc sulfide and nickel sulfide. The nickel is preferably nickel metal and in a particularly preferred embodiment the nickel is supported on a support material. Reducing the sulfur content of natural gas fed into an FBSG unit down to less than 0.1 vppm and preferably less than 80 vppb substantially reduces catalyst deactivation in a fluid bed syngas generator and increases the syngas productivity. When the sulfur content in natural gas fed into a FBSG containing a nickel reforming catalyst was reduced to less than 80 vppb, it resulted in less than a 1% per day activity loss. The low sulfur feed comprising primarily methane, is then fed into a syngas generating unit, along with steam and oxygen or air, and preferably oxygen, to produce a syngas comprising a mixture of $H_2$ and CO. The syngas is then contacted with zinc oxide to reduce the sulfur level in the syngas to the less than 10 vppb and preferably less than 3 vppb levels desired for feeding the syngas to a hydrocarbon synthesis (HCS) reactor. It also serves as a guard bed in the event of a sulfur breakthrough upstream of the syngas generator and from sulfur contaminants present in the syngas generating unit and from the other feed components. The very low sulfur syngas is then fed into an (HCS) reactor in which the $H_2$ and CO react in the presence of a suitable Fischer-Tropsch type of hydrocarbon synthesis catalyst at conditions effective to form hydrocarbons. In a slurry HCS process, at least a portion of the synthesized hydrocarbons comprise the slurry liquid and are solid at standard room temperature conditions of temperature and pressure (e.g., 75° F. and atmospheric pressure).

In a broad sense, the invention comprises removing sulfur compounds and $C_{4+}/C_{5+}$ hydrocarbons from natural gas to form a low sulfur gas comprising mostly methane, which contains less than 0.1 vppm and preferably less than 80 vppb of sulfur, by liquid absorption, low temperature separation and contact with zinc oxide followed by nickel. The low sulfur methane gas is then passed into a syngas generating unit to produce a syngas comprising a mixture of $H_2$ and CO having a low sulfur content or used for any other purpose. In a further embodiment, the syngas is contacted with zinc oxide to insure that the level of sulfur in the gas remains at less than 10 vppb and preferably less than 3 vppb of sulfur. By sulfur is meant sulfur compounds which include predominantly $H_2S$ and one or more of mercaptans (RSH), other organic compounds generally, carbonyl sulfide (COS) and $CS_2$. Except for the $H_2S$, all of the other sulfur bearing compounds may be considered as organic sulfur compounds.

The liquid absorption or scrubbing may selectively remove only the sulfur compounds or it may remove both the sulfur compounds and $CO_2$, if desired. The choice depends on the amount of $CO_2$ present in the natural gas and the extent to which various $CO_2$ and sulfur compound removal methods, such as amine scrubbing, are feasible. As a practical matter, if the amount of $CO_2$ exceeds about 2 mole % of the gas, removal is necessary to prevent plugging of the low temperature hydrocarbon separation unit downstream of the scrubbing. The use of amine scrubbing for either sulfur or both sulfur and $CO_2$ removal from gas streams, including natural gas, is well known and is disclosed, for example, in U.S. Pat. No. 4,405,585 relating to aqueous solutions of hindered amines. These processes are commercially available from Exxon as their FLEXSORB® and FLEXSORB PS® processes. By low temperature separation in the context of the invention is meant cooling the gas down to a temperature of at least 30° F., preferably at least 0° F. and more preferably at least about minus 20° F. This condenses more sulfur compounds out of the gas as well as the $C_{4+}/C_{5+}$ hydrocarbons. In a preferred embodiment of the invention the gas is cooled down to a temperature of from about 20 to −40° F. to maximize $C_{4+}/C_{5+}$ hydrocarbon recovery. The exact cut point for the $C_{4+}$ or $C_{5+}$ hydrocarbons depends on a number of variables, hence $C_{4+}/C_{5+}$ is used to indicate that at least the $C_{5+}$ and preferably also $C_4$ hydrocarbons are removed from the gas. It is preferred in the practice of the invention to take advantage of the high pressure (e.g., $\geq 1,000$ psig) of the natural gas recovered from the gas well, to cool the gas using Joule-Thomson and, if desired, flash expansion. The cooled mixture of gas and liquid $C_{4+}/C_{5+}$ hydrocarbons is then passed to a gas-liquid separator or knockout drum, to separate the gas from the condensed hydrocarbons. The cooled, sulfur and $C_{4+}/C_{5+}$ hydrocarbon reduced gas is then passed through one or more guard beds in which it is contacted with one or more sulfur absorbents and/or adsorbents which, in a preferred embodiment of the invention, sequentially comprises first zinc oxide and then nickel, to remove substantially all of the sulfur compounds remaining and produce a gas feed for the syngas generator containing less than 0.1 vppm, and preferably less than 80 vppb of sulfur compounds. It is preferred to heat the cool gas up to a temperature of at least about 150° F. and more preferably at least 200° F. before it contacts the sulfur absorbents, particularly when contacting the nickel. This increases the capacity and efficiency of the two sulfur absorbents. After passing through the absorbent beds, the gas may be fed into a syngas reactor to produce a syngas feed comprising a mixture of $H_2$ and CO for hydrocarbon syntheses or used for any other purpose.

BRIEF DESCRIPTION OF THE DRAWING

The FIGURE is a schematic flow diagram of a process of the invention.

DETAILED DESCRIPTION

While the composition of natural gas may vary widely depending on the location, it generally comprises mostly methane, along with nitrogen, $C_{2+}$ hydrocarbons, $CO_2$ and minor amounts of sulfur compounds, particularly $H_2S$ as set forth above. A typical natural gas useful as a feed for syngas generation comprises, for example, mostly methane (>50%), nitrogen in an amount from about 0–15%, about 2–15% $C_{2+}$ hydrocarbons (about 2–10% $C_2$–$C_4$ and 0–2% $C_{5+}$), $CO_2$ in an amount of up to about 2% and the remainder methane. These percents are all mole percent. The $C_{4+}/C_5+$ fraction of the $C_{2+}$ hydrocarbons typically ranges from between about 0.5 to 5 volume or mole %. Sulfur compounds, including primarily $H_2S$ for a sour natural gas, along with RSH, COS and other organic sulfur compounds are invariably present and must be removed to prevent deactivation of the catalyst in the syngas generator and in the HCS reactor(s) downstream. As set forth above, unless the sulfur compounds present in the feed to the syngas generator are less than 0.1 vppm and preferably less than 80 vppb, deactivation of the steam reforming catalyst occurs. Certain HCS catalysts, particularly those comprising a supported cobalt catalytic component are especially prone to sulfur deactivation which is not reversible. In the case of a slurry HCS reactor, this means that the reactor must be taken off line, drained, the dead catalyst separated from the hydrocarbon products which comprise a solid at standard conditions of room temperature and pressure, fresh catalyst and hydrocarbon liquid charged to the reactor and the reactor placed back on stream. To the extent that 0.1 vppm (100 vppb) of sulfur compounds can permanently deactivate the HCS catalyst within 10 days, this is extremely costly and substantially reduces hydrocarbon productivity. Therefore, the sulfir in the gas must be reduced below 0.1 vppm and preferably below 80 vppb prior to syngas production. The production of syngas by partial oxidation followed by a water gas shift reaction, by steam reforming, or by a combination of partial oxidation and steam reforming, is well known as is disclosed, for example, in U.S. Pat. Nos. 4,888,131 and 5,160,456 referred to above, the disclosures of which are incorporated herein by reference. Also known is catalytic partial oxidation in which the hydrocarbon and oxygen are premixed and passed over a noble metal catalyst at elevated temperature and pressure. While any suitable syngas generating process may be used in the practice of the invention, a fluid bed syngas generator FBSG is used in the drawing. As mentioned above, both FBSG and autothermal reforming employ partial oxidation and steam reforming to form a mixture of $H_2$ and CO, with the autothermal reforming process first partially oxidizing the methane and then passing it through a fixed bed of catalyst in which it is adiabatically steam reformed. In an FBSG, the fluid bed of catalyst provides more efficient heat transfer and both the partial oxidation and steam reforming occur in the presence of the reforming catalyst. The catalyst may be any conventional steam-reforming catalyst, or autothermal reforming catalyst. Such catalysts can be described as including one or more catalytic metal components of metal selected from Group VII and Group VIII (Sargent-Welch Periodic Table of the Elements, © 1968) supported on an attrition resistant refractory support, such as a pure alpha alumina. Group VIII metals are preferred and the invention is useful with both noble and non-noble metals of the Group VIII metals. Nickel is preferred due to its low cost, resistance to sulfur poisoning and catalytic effectiveness for the syngas generation. Such catalysts are well known and references to their preparation and composition may be found in the '131 and '456 patents referred to above, in the literature, and also in U.S. Pat. No. 5,395,406. In the fluid bed of the FBSG process, the supported steam reforming catalyst is typically mixed with an inert, attrition resistant, particulate refractory to improve heat transfer and to conserve the catalytic metal component. This is known and disclosed in the '131 and '456 patents and in U.S. Pat. No. 5,395,813. While the nickel loading on a catalyst particle will range from between about 1 to 20 wt. %, when the fluidized bed also contains the inert heat transfer particles, the nickel loading in the bed will typically range from about 0.02 to 3 wt. % of the total weight of the particles constituting the bed. The methane feed to steam molar ratio for the FBSG is at least about 1:1, preferably from about 1:1 to 1:3 and more preferably 1.5:1 to 2.5:1. The oxygen to methane feed molar ratio is about 0.2:1 to 1:1 and preferably 0.4:1 to 0.6:1. If oxygen is used instead of air, the methane feed and oxygen may be separately diluted with steam and/or $CO_2$ before being passed into the reaction zone. The ratio of steam to $CO_2$ is chosen so as to achieve the desired $H_2$/CO product ratio. The FBSG is typically run so as to produce a syngas having the $H_2$ and CO in a 2:1 mole ratio, with the so-produced syngas then fed into an HCS reactor to form more valuable hydrocarbons from the gas. The conditions in a FBSG include pressures in the range of about 10–50 atmospheres, preferably 10–40 atmospheres and more preferably 20–40 atmospheres, while the temperature will range to within about 50° F. of the softening point of the, essentially non-catalytic, heat carrying particles, preferably from about 1650° F. to about 2000° F. and more preferably from about 1700° F. to about 1800° F. The practical upper limits of temperature and pressure are determined by the ability of the catalyst, reactor and heat transfer particles to withstand the higher temperatures and pressures.

Referring to the FIGURE, a sour natural gas containing $C_{4+}$/$C_{5+}$ hydrocarbons, $CO_2$ and sulfur compounds which include $H_2S$, RSH, COS and other organic sulfur compounds is produced from a natural gas well and passed, via line 10, into a hindered amine scrubbing zone in vessel 12, in which it contacts an acid gas absorbent comprising an aqueous solution of hindered amine, such as an aqueous solution of 2-piperidine, ethanol and sulfolane, as disclosed in U.S. Pat. No. 4,112,051. The hindered amine solution enters the tower via line 14 and simultaneously removes the $CO_2$ and most of the sulfur compounds from the gas. The sulfur compounds which were present in the gas at a level of about 5,000 vppm $H_2S$ and 100 vppm organic sulfur compounds, are removed down to a level of about 1 vppm $H_2S$ and 1 vppm of the organic sulfur compounds. Vessel 12 is a simple counter current or cocurrent contacting tower containing packing such as ceramic rings, saddles and the like. The $CO_2$ and sulfur containing, aqueous amine absorbent solution is removed from bottom of the vessel via line 16 and processed by means not shown, to regenerate the absorbent by desorbing and separating the sulfur and $CO_2$ to recover the amine solution, which is then recycled back into the contacting zone. The $CO_2$ and sulfur reduced gas is removed from the scrubbing zone via line 18 and passed through a dryer 20 and then a mercury removal vessel 24 via line 22. The drier and mercury removal vessels each contain commercially available molecular sieves designed for removing moisture and mercury. From there, the gas which is at a pressure of about 900 psig and a temperature of about 120° F. is passed into a cooler or cooling zone indicated by box 28, via line 26. In the practice of the invention, it is preferred that the gas be self chilled to condense out the $C_{4+}$/$C_{5+}$ hydrocarbons by Joule-Thomson expansion. This avoids the need for external refrigeration units and attendant compressors. However, if desired, refrigeration units may be used for all or part of the gas chilling to condense out the additional sulfur compounds and the $C_{4+}$/$C_{5+}$ hydrocarbons.

Further, while zone 28 is illustrated by the simple box for the sake of convenience, in reality it will comprise a plurality of indirect heat exchangers. The saw-tooth lines in box 28 indicate heat exchange surface associated with a particular stream. In zone 28 the gas is chilled by indirect heat exchange, which is explained below, which chills it to about −20° F. The chilled gas then passes into vessel 30 in which it is permitted to flash (rapidly expand), which results in condensation of the $C_{3+}$ hydrocarbons which are removed from the bottom via line 32, with the gas removed from the top via line 42. The temperature and pressure in vessel 30 are about 30° F. and 600 psig. The liquid condensate removed via line 32 is passed into gas-liquid separator 36, which may be a simple knock-out drum, after passing through a Joule-Thomson expansion valve 34 in line 32. This further reduction in pressure results in vaporization of some of the $C_{3+}$ hydrocarbons and produces a reduction in temperature of the mixture to about −100° F. The mixture is then separated in vessel 36. The cold $C_{3+}$ hydrocarbon condensate is removed from the bottom of the separator via line 38 and, in this embodiment, is passed through cooling zone 28 to provide part of the cooling for the gas stream passing through to vessel 30. At the same time, the cold gas is removed from the top of 36 via line 40 and also passed through zone 28 to provide additional cooling of the incoming gas stream. Passing through the cooling zone heats both the hydrocarbon liquid condensate and the gas up to a temperature of about 100° F. After passing through the cooling zone, the gas and liquid condensate streams 38 and 40 are combined and sent to a fractionator (not shown) from which the $C_{4+}$/$C_{5+}$ hydrocarbons are recovered and passed to one or more upgrading operations (not shown), such as hydrorefining, to remove the sulfur and then fractionated to naphtha, chemical and diesel fractions. Turning again to vessel 30, the main gas stream, which is now at a temperature and pressure of about −30° F. and 600 psig., is removed from the vessel via line 42 and passed through the cooling zone 28 to provide some of the cooling requirements for cooling the gas stream passing through via line 26 and associated heat exchange surface. As the gas passes from vessel 30 to cooling zone 26, it passes through a Joule-Thomson valve 44 which further reduces the temperature and pressure to −40° F. and 500 psig. before it enters the cooling zone. Indirect heat exchange with the hot incoming gas stream heats the gas in line 42 from about— 40° F. up to about 100° F. This gas now has about 0.7 vppm of $H_2S$ and 0.7 vppm of RSH and other organic sulfur compounds. After leaving the cooling zone, the gas passes through at least one absorption and/or adsorption zone for removing the remaining sulfur from the gas to produce a methane gas having less than 0.1 vppm and preferably less than 80 vppb of total sulfur. Suitable absorbents include molecular sieves, activated carbon and the like. However, it is preferred that the sequential use of zinc oxide and nickel absorbents be used to remove the sulfur, irrespective of whether or not one or more adsorbents are used. In the embodiment shown in the FIGURE, which is a preferred embodiment, at least two sulfur absorbing zones are shown, with each zone comprising a fixed bed of a solid, particulate sulfur absorbent. The first zone contains a sulfur absorbent comprising solid, particulate zinc oxide and the second zone contains a sulfur adsorbent comprising solid, particulate nickel supported on an inert support, such as alumina. Supported nickel is preferred to the solid bulk metal in order to achieve a greater surface area to mass ratio, as the absorption occurs on the surface of the nickel. It has been found that, while zinc oxide has a greater capacity for sulfur absorption than nickel, particularly for $H_2S$, the zinc oxide has an unacceptably high sulfur "leak rate" which is believed to be due to COS, $C_{2+}$ mercaptans and perhaps other organic sulfur compounds. On the other hand, it has also been found that while nickel has a lower overall capacity for adsorbing sulfur than the zinc oxide, it has greater selectivity and capacity for COS, $C_{2+}$ mercaptans and perhaps other organic sulfur compounds than the zinc oxide. Mixing zinc oxide with nickel or placing the nickel upstream of the zinc oxide does not produce the low sulfur level of less than 0.1 vppm and preferably less than 80 vppb that is achieved by placing the zinc oxide upstream of the nickel. The zinc absorbent may be mixed with nickel if desired, as long as there is a sulfur adsorbent zone comprising nickel downstream of the zinc oxide. However, this is a waste of the nickel. The zinc oxide and nickel absorbent beds may be in series in the same vessel, but it is more convenient that they be in separate vessels. Further, more than one zone or vessel containing a bed of each absorbent may be used. Thus, in the preferred embodiment shown in the FIGURE, after leaving the cooling zone or vessel 28, the gas passes through a heat exchanger 46 in which it is heated to a temperature of from about 300 to 450° F. The hot gas exits the heat exchanger via line 48 and passes into absorption zone 50 in which it contacts zinc oxide first and then in absorption zone 54 via line 52, in which it contacts nickel. In this embodiment, each absorption zone is in a separate vessel as shown. Heating the gas enables more absorption of the sulfur compounds in the downstream adsorbent beds. The zinc oxide removes the $H_2S$ and some, but not all (e.g., $C_{2+}$ mercaptans), of the mercaptan sulfur from the gas. The nickel removes the remaining sulfur compounds, including COS and $C_{2+}$ mercaptans to produce a gas having a total sulfur content of less than 0.1 vppm and preferably less than 80 vppb. In practice, two or more parallel trains of two or more sequential sets of the zinc oxide and nickel beds in separate vessels will be used, to prevent sulfur breakthrough from the first set from reaching the syngas generator and to enable some of the beds to be on a regeneration cycle, while others are in an absorption mode. After passing through the sulfur absorption zones, the gas is fed via line 56 into an FBSG 58, along with oxygen and water vapor which enter via lines 60 and 62, respectively. FBSG 58 contains a fluid bed of a steam reforming catalyst within (not shown) and the very low sulfur gas comprising primarily methane is partially oxidized and steam reformed to produce a syngas comprising a mixture of $H_2$ and CO at a mole ratio of 2.1:1. The particulate catalyst comprises a catalytic nickel metal component on a high purity alumina support. In the FBSG or other syngas generator, the remaining sulfur compounds are converted to $H_2S$. The syngas is produced in an amount of about three times the volume of the hydrocarbon feed gas. This means that the sulfur content of the syngas is about one third that of the hydrocarbon feed gas. This syngas leaves the FBSG via line 64 and passes through a third sulfur adsorbent zone 66 which comprises a fixed bed of particulate zinc oxide, to ensure that the total sulfur level in the syngas passed to a slurry HCS reaction zone 70 via line 68 is less than 10 vppb and preferably less than 3 vppb. This zinc oxide adsorbent bed also serves as a guard bed to adsorb any sulfur that might have been introduced into the FBSG by the oxygen or water vapor, from the catalyst and from the ceramic insulation in the FBSG. It also protects against sulfur breakthrough upstream of the syngas generator. While a FBSG is shown in the FIGURE, the invention is not limited to FBSG for the syngas generation. This syngas passes up into the slurry HCS reactor in which the slurry comprises gas bubbles and an HCS catalyst comprising a supported catalytic cobalt component in a hydrocarbon liquid which comprises products of the hydrocarbon reaction that are liquid at the reaction conditions. In the HCS reactor, the syngas reacts in the presence of the catalyst at conditions effective to produce hydrocarbons, at least a portion of which are liquid at the reaction conditions, with a catalyst half life of at least 30, preferably 80 and more preferably at least 150 days, depending on the amount of sulfur in the syngas, with at least 30 days being the half life at 10 vppb of sulfur and 150 days at less than 3 vppb. The synthesized hydrocarbon liquids are withdrawn from the reactor by filter means indicated by box 72 and passed via line 74 to upgrading by fractionation and/or one or more hydroconversion operations, while the gas products of the HCS reaction are removed overhead via line 76 and passed to further processing.

In an HCS process, liquid and gaseous hydrocarbon products are formed by contacting a syngas comprising a mixture of $H_2$ and CO with a Fischer-Tropsch type of HCS catalyst, under shifting or non-shifting conditions and preferably under non-shifting conditions in which little or no water gas shift reaction occurs, particularly when the catalytic metal comprises Co, Ru or mixture thereof. In an HCS reactor the catalyst will be in a fixed bed, fluid bed or suspended in a slurry liquid. These processes, including suitable catalysts and operating conditions, are in the literature and are well known to those skilled in the art. Suitable Fischer-Tropsch reaction types of catalysts for hydrocarbon synthesis are well known and comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

In a Fischer-Tropsch slurry HCS process, a syngas comprising a mixture of $H_2$ and CO is bubbled up into a reactive HCS slurry in which it is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry HCS process the mole ratio of the $H_2$ to CO is typically about 2.1/1. Slurry HCS process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins, in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. Slurry catalyst rejuvenation conditions of temperature and pressure are similar to those for hydrocarbon synthesis and are disclosed in the prior art.

The hydrocarbons produced by a slurry HCS process according to an embodiment of the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

The invention will be further understood with reference to the example below.

EXAMPLE

With specific reference to the FIGURE, natural gas at a pressure of about 1000 psig and a temperature of about 100° F. is passed into a hindered amine treating unit 12 in which it contacts an aqueous solution of the amine. On a basis of 100.9 moles of gas per hour, the natural gas has a composition comprising 84.1 moles of methane, 5.6 moles of $C_2$ hydrocarbons, 3.8 moles of nitrogen, 3.3 moles of $C_{3+}$ hydrocarbons, 1.5 moles of $C_{4+}$ hydrocarbons, 2.14 moles of $CO_2$, 0.5 moles of $H_2O$, with the remainder $H_2S$ and organic sulfur compounds of which over 95% is $H_2S$. The gas exiting the amine treating unit has less than 1000 vppm of $CO_2$, about 1 vppm of $H_2S$ and 1 vppm organic sulfur compounds. The gas is then passed into the adiabatic expansion cryogenic unit in which the expansion of the gas through one or more orifices cools the gas down to $-30°$ F. This causes the $C_{4+}$ hydrocarbons and more of the sulfur to condense out of the gas, with the gas and liquid mixture then passed into a separator in which the condensed hydrocarbon liquid is separated and removed from the gas to produce a gas containing less than 1 vppm total sulfur. The cold gas is then heated to about 350° F. and sequentially passed through adsorbent beds first of zinc oxide and then nickel in which more sulfur is adsorbed to produce a syngas feed containing less than 0.1 vppm of total sulfur. This sulfur reduced gas is then passed into an FBSG syngas generator. The syngas produced in the FBSG is passed through a zinc oxide bed to insure that its total sulfur level is below 10 vppb and preferably below 3 vppb, and then passed into a slurry HCS reactor in which the slurry comprises gas bubbles and an HCS catalyst comprising a supported catalytic cobalt component in a hydrocarbon liquid, wherein the liquid comprises products of the hydrocarbon reaction which are liquid at the reaction conditions. In the HCS reactor, the syngas is reacted in the presence of the catalyst at conditions effective to produce hydrocarbons, at least a portion of which are liquid at the reaction conditions, with a catalyst half life of at least 30, preferably at least 80 and more preferably at least 150 days.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for producing a synthesis gas comprising a mixture of $H_2$ and CO from a sour natural gas comprising mostly methane which also contains $C_{4+}/C_{5+}$ hydrocarbons, $CO_2$, $H_2S$, $C_{2+}$ mercaptans and COS, with recovery of said $C_{4+}/C_{5+}$ hydrocarbons from said gas, which comprises (a) contacting said sour natural gas with an aqueous amine solution to remove most of said H2S and organic sulfur compounds to produce a sulfur reduced gas containing less than 2 vppm of total sulfur compounds;

(b) cooling said sulfur reduced gas to a temperature sufficient to condense said $C_{4+}/C_{5+}$ hydrocarbons and some of the remaining sulfur compounds to liquids;

(c) separating said condensed liquids from said cool sulfur reduced gas;

(d) recovering said $C_{4+}/C_{5+}$ hydrocarbons;

(e) heating said cool sulfur reduced gas to a temperature of at least about 100° F. to produce a heated sulfur reduced gas;

(f) contacting said heated sulfur reduced gas with ZnO and then with nickel to remove more sulfur compounds from said heated sulfur reduced gas and produce a very low sulfur content gas comprising methane which contains less than 0.1 vppm of sulfur compounds;

(g) passing said very low sulfur content gas produced in (f) into a synthesis gas generating zone in which it reacts with oxygen to form said synthesis gas.

2. A process according to claim 1 wherein said very low sulfur content gas reacts with oxygen and steam in said synthesis gas generating zone to produce synthesis gas.

3. A process according to claim 2 wherein said synthesis gas is contacted with zinc oxide to produce a synthesis gas having a sulfur content less than 10 vppb.

4. A process according to claim 3 wherein said synthesis gas is reacted in the presence of a sulfur sensitive hydrocarbon synthesis catalyst at reaction conditions effective to form hydrocarbons, at least a portion of which are solid at standard conditions of room temperature and pressure and wherein said catalyst has a half life of at least 30 days.

5. A process according to claim 4 wherein at least a portion of said hydrocarbons are upgraded by one or more hydroconversion operations.

6. A process according to claim 5 wherein said synthesis gas has a sulfur content less than 3 vppb and wherein said hydrocarbon synthesis catalyst half life is at least 150 days.

\* \* \* \* \*